(12) United States Patent
Conklin et al.

(10) Patent No.: US 8,259,733 B2
(45) Date of Patent: Sep. 4, 2012

(54) SYSTEMS AND METHODS FOR RAPID OPTICAL TRANSPORT NETWORK CIRCUIT PROVISIONING

(75) Inventors: Richard W. Conklin, Gainesville, GA (US); Matthew Connolly, Canton, GA (US); Vagish Madrahalli, Woodstock, GA (US)

(73) Assignee: Ciena Corporation, Hanover, MD (US)

( * ) Notice: Subject to any disclaimer, the term of this patent is extended or adjusted under 35 U.S.C. 154(b) by 721 days.

(21) Appl. No.: 12/430,526

(22) Filed: Apr. 27, 2009

(65) Prior Publication Data

US 2010/0272438 A1 Oct. 28, 2010

(51) Int. Cl.
*H04L 12/56* (2006.01)
(52) U.S. Cl. .................... 370/395.51; 398/5
(58) Field of Classification Search .............. None
See application file for complete search history.

(56) References Cited

U.S. PATENT DOCUMENTS

| | | | | |
|---|---|---|---|---|
| 7,174,002 B1* | 2/2007 | Burns | ........................ | 379/10.02 |
| 2003/0123493 A1* | 7/2003 | Takahashi | ..................... | 370/539 |
| 2005/0063700 A1* | 3/2005 | Shin et al. | ........................ | 398/30 |
| 2005/0185643 A1* | 8/2005 | Goldberg et al. | ............ | 370/389 |
| 2007/0292129 A1* | 12/2007 | Yan et al. | ........................... | 398/5 |
| 2008/0080860 A1* | 4/2008 | Katagiri | ............................ | 398/43 |
| 2008/0175590 A1* | 7/2008 | Perkins et al. | ................... | 398/58 |
| 2008/0219661 A1* | 9/2008 | Lanzone et al. | ................. | 398/45 |
| 2009/0257756 A1* | 10/2009 | Fukumitsu | ..................... | 398/202 |
| 2010/0054731 A1* | 3/2010 | Oltman et al. | ..................... | 398/1 |
| 2010/0172645 A1* | 7/2010 | Liu et al. | ........................... | 398/25 |

OTHER PUBLICATIONS

Germano Gasparini, Gert Grammel, Dimitri Papadimitriou; "Traffic Engineering Extensions to OSPF and ISIS for GMPLS Control of G. 709 Optical Transport Networks"; CCAMP Working Group; http://letfreport.Isoc.orgi.all-ids/draft; Jun. 2002.
Papadimitriuou Dimitri; "EURESCOM Enabling Generalized MPLS Control for G.709 Optical Transport Networks"; EURESCOM—Oct. 2001.
Jing Wu, and H.T. Mouftah; "Integrated Shim Layer"; Department of Electrical and Computer Engineering, Queen's University, Ontario, CA; (c)2000 Optical Society of America.

* cited by examiner

*Primary Examiner* — Phirin Sam
(74) *Attorney, Agent, or Firm* — Clements Bernard PLLC; Christopher L. Bernard; Lawrence A. Baratta, Jr.

(57) ABSTRACT

The present disclosure provides systems and methods for rapid circuit provisioning in Optical Transport Networks (OTN) using signaling and routing protocols thereby enabling fast mesh restoration. The present invention utilizes a shim layer between OTN messaging (e.g., GCC or High-Level Data Link Control (HDLC)) and the associated signaling and routing protocol (e.g., OSRP, GMPLS, etc.). If an ODUk Connection CTP or TTP needs to be created, the shim layer runs a fast "OTN Setup" protocol, while buffering out going OTN messages. Incoming messages are still processed and do not require additional buffering. The purpose of the OTN Setup protocol is to allow the OTUk to re-frame on its client ODUk, while buffering out-going messages. When re-framing completes, buffers are released and the OTN messaging resumes without dropping any of the signaling frames.

17 Claims, 11 Drawing Sheets

SYSTEMS AND METHODS FOR RAPID OPTICAL TRANSPORT NETWORK CIRCUIT PROVISIONING

FIELD OF THE INVENTION

The present invention relates generally to networking systems and methods. More particularly, the present invention relates to systems and methods for rapid circuit provisioning in Optical Transport Networks (OTN) and automatic interface creation using signaling and routing protocols.

BACKGROUND OF THE INVENTION

ITU-T defines OTN as a set of Optical Network Elements connected by optical fiber links, able to provide functionality of transport, multiplexing, switching, management, supervision and survivability of optical channels carrying client signals. ITU Standard G.709 is commonly called Optical Transport Network (OTN) or digital wrapper technology. OTN is currently offered in three rates, OTU1, OTU2, and OTU3, and future rates are expected such as OTU4, where OTU stands for Optical Channel Transport Unit. OTU provides the electrical functions to support the management of an optical channel section, i.e., section monitor (section trail trace identifier, section error detection code (BIP-8), defect indication functions, general communications channel), and provides for transport of the optical channel data unit (ODUk). OTU1 has a line rate of approximately 2.7 Gb/s and was designed to transport a SONET OC-48 or an SDH STM-16 signal. OTU2 has a line rate of approximately 10.7 Gb/s and was designed to transport an OC-192, STM-64 or 10 Gbit/s WAN. OTU2 can be overclocked (non-standard) to carry signals faster than STM-64/OC-192 (9.953 Gb/s) like 10 gigabit Ethernet LAN PHY coming from IP/Ethernet switches and routers at a full line rate (approximately 10.3 Gb/s). This is specified in G.Sup43 and called OTU2e. OTU3 has line rate of approximately 43 Gb/s and was designed to transport an OC-768 or STM-256 signal. OTU4 is currently under development to transport future 100 GbE signal. The ODUk provides the electrical functions to support the management of an optical channel data path, i.e., path monitor (path trail trace identifier, path error detection code (BIP-8), defect indication functions, general communications channel, automatic protection switching channel), provides the electrical functions to support the management of tandem optical channel data paths, i.e., tandem connection monitors (tandem connection trail trace identifier, tandem connection path error detection code (BIP-8), defect indication functions, automatic protection switching channel), and provides for transport of the optical channel payload (OPUk).

Of note, OTN is defined in various standards such as: ITU-T G.709 Interfaces for the optical transport network (OTN); ITU-T G.798 Characteristics of optical transport network hierarchy equipment functional blocks; OTN Standard FEC (Called GFEC sometimes) is defined in ITU-T G.975; OTN Jitter is defined in ITU-T G.8251: The control of jitter and wander within the optical transport network (OTN); G.870: Terms and definitions for Optical Transport Networks (OTN); G.871: Framework for optical transport network Recommendations; G.873.1: Optical Transport Network (OTN): Linear protection; G.874: Management aspects of the optical transport network element; G.874.1: Optical transport network (OTN): Protocol-neutral management information model for the network element view; G.959.1: Optical transport network physical layer interfaces; G.8201: Error performance parameters and objectives for multi-operator international paths within the Optical Transport Network (OTN). In addition to the OTN Standard FEC (GFEC), a proprietary FEC could be used.

OTN can be utilized with a signaling and routing protocol to provide automatic resource discovery, distributing network resource information, establishing and restoring connections dynamically across the network, and the like. Exemplary signaling and routing protocols include Optical Signaling and Routing Protocol (OSRP), Automatically Switched Optical Networks (ASON), Generalized Multi-Protocol Label Switching (GMPLS), and the like. The signaling and routing protocol can be utilized to provide OTN mesh networks. In OTN mesh networks, unused or protect OTUk/ODUk lines are usually transmitting the open channel signal (OCI) or other maintenance signal in the ODUk overhead. The signaling and routing protocol operates on a control plane in a network and provides automatic resource discovery, distribution of network resource information, establishment and restoration of connections dynamically across the network, and the like. For example, OSRP is a distributed protocol designed for controlling a network of optical cross-connects (OXCs). OSRP introduces intelligence in the control plane of an optical transport system. It can perform many functions such as automatic resource discovery, distributing network resource information, establishing and restoring connections dynamically across the network, and the like.

Referring to FIG. 1, a diagram illustrates the OTUk frame structure 100 mapping an ODUk 102 into an OTUk 104 according to OTN. In-band OSRP or GMPLS messages are transmitted and received using the General Communication Channel (GCC) in the OTUk/ODUk overhead; these bytes have a specified location relative to the OTUk frame. Unlike the SONET/SDH line/MS and path relationship, there is no timing adaptation between the OTUk 104 and the ODUk 102. The OTUk 104 frame is an extension of the ODUk 102 frame. The relative location of the ODUk 102 and OTUk 104 overhead is fixed, and the mapping of ODUk/OTUk is synchronous—meaning that the reference clock for the OTUk 104 information must also be the reference clock for the ODUk 102 information.

Referring to FIG. 2, an exemplary OTN network 200 includes four nodes 202a-202d with OTUk lines between each node 202a-202d. The OTUk lines are designated OTUk AB, OTUk BD, OTUk CD, and OTUk AC to designate the two endpoints of each line. The OTN network 200 is configured to utilized OSRP running over the in-band GCC on each OTUk line. A single ODUk sub-network connection (SNC) 204 is routed from node 202a through node 202b to node 202d at corresponding Trail Termination Points TTP A1, TTP B1, TTP B2, and TTP D1 {A1-B1-B2-D1}. The corresponding OTUk interfaces that are not supporting any cross-connects (i.e., TTPs A2, C1, C2, D2) transmit OCI 206. Timing for these interfaces (i.e., TTPs A2, C1, C2, D2) comes either from a local source on the node, or from an external network reference. In the event of a failure along the interfaces A1-B1-B2-D1, setup and connect messages are signaled back and forth between the nodes 202a-202d to reserve bandwidth and set up cross-connects. The circuit is re-routed to A2-C1-C2-D2. While the new ODUk circuit is being provisioned, each OTUk line must re-frame on the ODUk that originates on node 202a. During this re-framing, GCC signaling messages are dropped.

The above scenario can be extended to the case where an OTUk line is advertising mixed capability (e.g., ODU2, ODU1, ODU0, OPVC1), and the system has to configure a multiplex structure to support the requested circuit. In these cases the OTUk also loses frame momentarily and has the potential to drop GCC messages. RSVP protocols can retransmit dropped frames, but retransmission relies on timers in the protocol, and network restoration performance can be seriously affected. For example, OSRP has a four second timer for Setup and Connect retransmission. Carrier-grade transport networks often require restoration times below 100 ms.

Conventionally, there are a couple of solutions to overcome the dropped GCC messages and retransmission to speed up network restoration times. For example, an out-of-band data network could be used to run the routing and signaling protocols. Disadvantageously, this is more costly and requires an overlaid network, and can have performance issues if the network is shared with other applications. Higher order ODUk terminations could be pre-provisioned, i.e. without dynamic restoration through the signal and routing protocol. Here, the network 200 could only support routing of lower order ODUj signals. Disadvantageously, this severely limits the network, but maintains a communication channel through the pre-provisioned OTUk/ODUk GCC. Finally, conventional solutions simply rely on Setup/Connect re-transmission when messages are dropped accepting the resulting mesh restoration times above carrier-grade requirements. None of these solutions is acceptable in an ODUk transport network where fast mesh restoration is required.

BRIEF SUMMARY OF THE INVENTION

In various exemplary embodiments, the present invention provides systems and methods for rapid circuit provisioning in Optical Transport Networks (OTN) using signaling and routing protocols thereby enabling fast mesh restoration. The present invention utilizes a shim layer between OTN messaging (e.g., GCC or High-Level Data Link Control (HDLC)) and the associated signaling and routing protocol (e.g., OSRP, GMPLS, etc.). If an ODUk Connection Termination Point (CTP) or TTP needs to be created, the shim layer runs a fast "OTN Setup" protocol, while buffering out going OTN messages. Incoming messages are still processed and do not require additional buffering. The purpose of the OTN Setup protocol is to allow the OTUk to re-frame on its client ODUk, while buffering out-going messages. When re-framing completes, buffers are released and the OTN messaging resumes without dropping any of the signaling frames. Since running the OTN Setup protocol completes before any signaling and routing protocol packets are dropped, it can operate transparently with respect to the signaling and routing protocol, and can be easily ported without modifying signaling and routing protocol itself.

In an exemplary embodiment of the present invention, an Optical Transport Network node includes a control plane; an Optical Transport Network framer; and an intermediate layer between the control plane and the Optical Transport Network framer, wherein the intermediate layer is configured to perform a fast Optical Transport Network mechanism for Optical Transport Network connections. The intermediate layer includes a buffer configured to receive messages from the control plane; a buffer enable switch configured to enable and disable the buffer; and a processor connected to the buffer enable switch, the control plane, and the Optical Transport Network framer. The processor is configured to responsive to an Optical Transport Network connection change, buffer outgoing messages from the control plane; and responsive to re-framing associated with the Optical Transport Network connection change, release the buffered outgoing messages from the control plane such that the outgoing messages are not lost during the re-framing thereby speeding up the Optical Transport Network connection change. The intermediate layer is configured to provide incoming messages from the Optical Transport Network framer to the control frame without buffering. The processor can be configured to implement a state machine to process incoming and outgoing messages to and from the control plane ensuring no messages are lost during an Optical Transport Network connection change requiring re-framing. Optionally, the intermediate layer operates independently of the control plane ensuring no messages are lost during an Optical Transport Network connection change requiring re-framing. The Optical Transport Network node further includes an automatic interface creation process configured to automatically partition an interface at the node into required Trail Termination Points with a required payload type mapping to carry circuits of a type requested by a peer node. The automatic interface creation process is configured to allow the control plane to route and signal connections across Trail Termination Points that are not fully provisioned. The control plane utilizes one of Optical Signaling and Routing Protocol (OSRP), Automatically Switched Optical Networks (ASON), and Generalized Multi-Protocol Label Switching (GMPLS). Optionally, the Optical Transport Network node is in a mesh network providing restoration through the control plane.

In another exemplary embodiment of the present invention, a fast Optical Transport Network setup method includes responsive to an Optical Transport Network connection change, buffering outgoing messages from a signaling and routing protocol associated with a control plane; re-framing an Optical Transport Network connection responsive to the Optical Transport Network connection change; responsive to re-framing, releasing the buffered outgoing messages from the signaling and routing protocol such that the outgoing messages are not lost during the re-framing thereby speeding up the Optical Transport Network connection change. The fast Optical Transport Network setup method further includes receiving incoming messages from the signaling and routing protocol during the re-framing. The fast Optical Transport Network setup method further includes providing the Optical Transport Network connection change without requiring retransmission of outgoing messages from the signaling and routing protocol. Optionally, the fast Optical Transport Network setup method further includes responsive to the Optical Transport Network connection change, automatically creating Trail Termination Points for a connection based on a connection type; updating a routing database; and publishing the available bandwidth in the routing database. The signaling and routing protocol includes one of Optical Signaling and Routing Protocol (OSRP), Automatically Switched Optical Networks (ASON), and Generalized Multi-Protocol Label Switching (GMPLS).

In yet another exemplary embodiment of the present invention, a method to automatically partition an interface into required Trail Termination Points includes configuring a plurality of Trail Termination Points between nodes in a network; responsive to a connection change in the network, automatically creating Trail Termination Points for a connection based on a connection type; updating a routing database at each node in the network; and publishing the available bandwidth in the routing database. The method is implemented in a network of a plurality of Optical Transport Network links and a control plane. The method further includes responsive to the connection change in the network, buffering outgoing messages from the control plane until the connection change is reframed on one of the Optical Transport Network links. Optionally, the method further includes utilizing the control plane to route and signal connections across Trail Termination Points that are not fully provisioned. Alternatively, the method further includes providing mesh restoration without requiring retransmission of messages from the control plane.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for rapid circuit provisioning in Optical Transport Networks (OTN) using signaling and routing protocols thereby enabling fast mesh restoration. The present invention utilizes a shim layer between OTN messaging (e.g., GCC or High-Level Data Link Control (HDLC)) and the associated signaling and routing protocol (e.g., OSRP, GMPLS, etc.). If an ODUk Connection Termination Point (CTP) or TTP needs to be created, the shim layer runs a fast "OTN Setup" protocol, while buffering out going OTN messages. Incoming messages are still processed and do not require additional buffering. The purpose of the OTN Setup protocol is to allow the OTUk to re-frame on its client ODUk, while buffering out-going messages. When re-framing completes, buffers are released and the OTN messaging resumes without dropping any of the signaling frames. Since running the OTN Setup protocol completes before any signaling and routing protocol packets are dropped, it can operate transparently with respect to the signaling and routing protocol, and can be easily ported without modifying signaling and routing protocol itself.

The present invention relates to networks, network elements, and methods utilizing OTN with a signaling and routing protocol to provide fast OTN circuit provisioning thereby enabling fast mesh restoration. In describing the exemplary embodiments herein, reference is made to OSRP paths, links, legs, and lines with respect to the signaling and routing protocol. However, the present invention is not limited to OSRP. Those skilled in the art will recognize that other intelligent signaling and routing protocols that can (or can be modified to) provide similar functionality as OSRP (e.g., automatically establishing and restoring connections across the network, and the like) are within the scope of embodiments of the invention.

Figure 1:
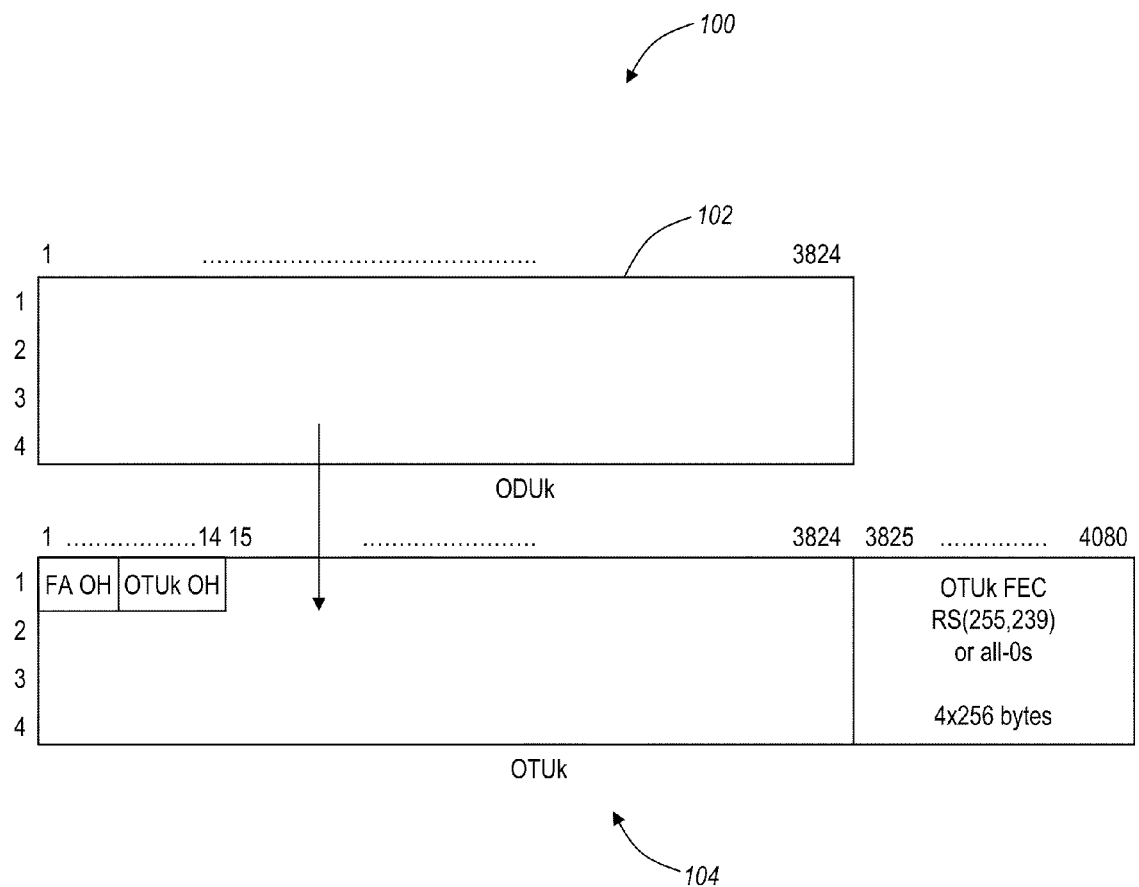
FIG. 1 is a diagram of the OTUk frame structure mapping an ODUk 102 into an OTUk 104 according to OTN.
Figure 2:
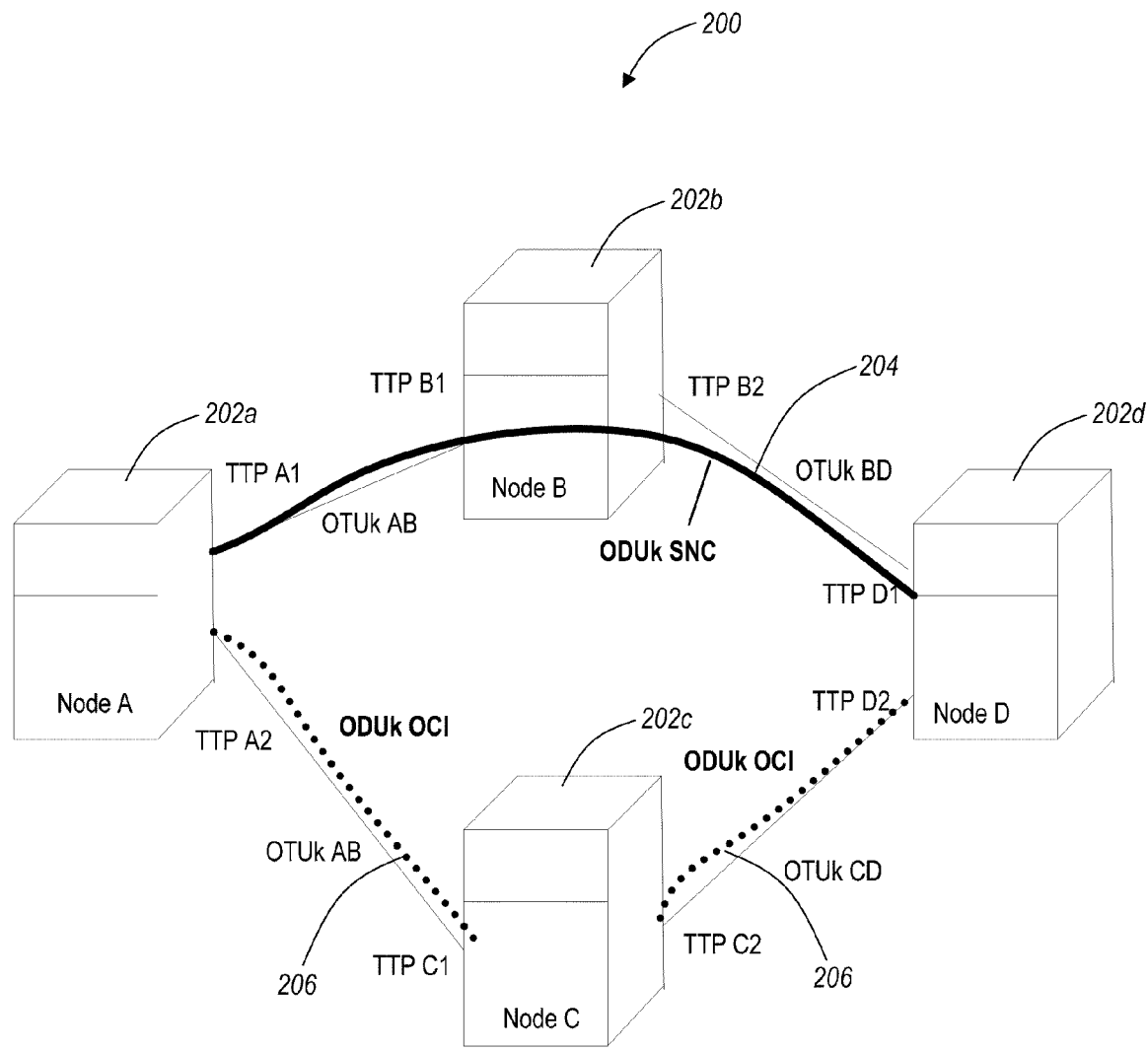
FIG. 2 is a diagram of an exemplary OTN network including four nodes with OTUk lines between each node.
Figure 3:
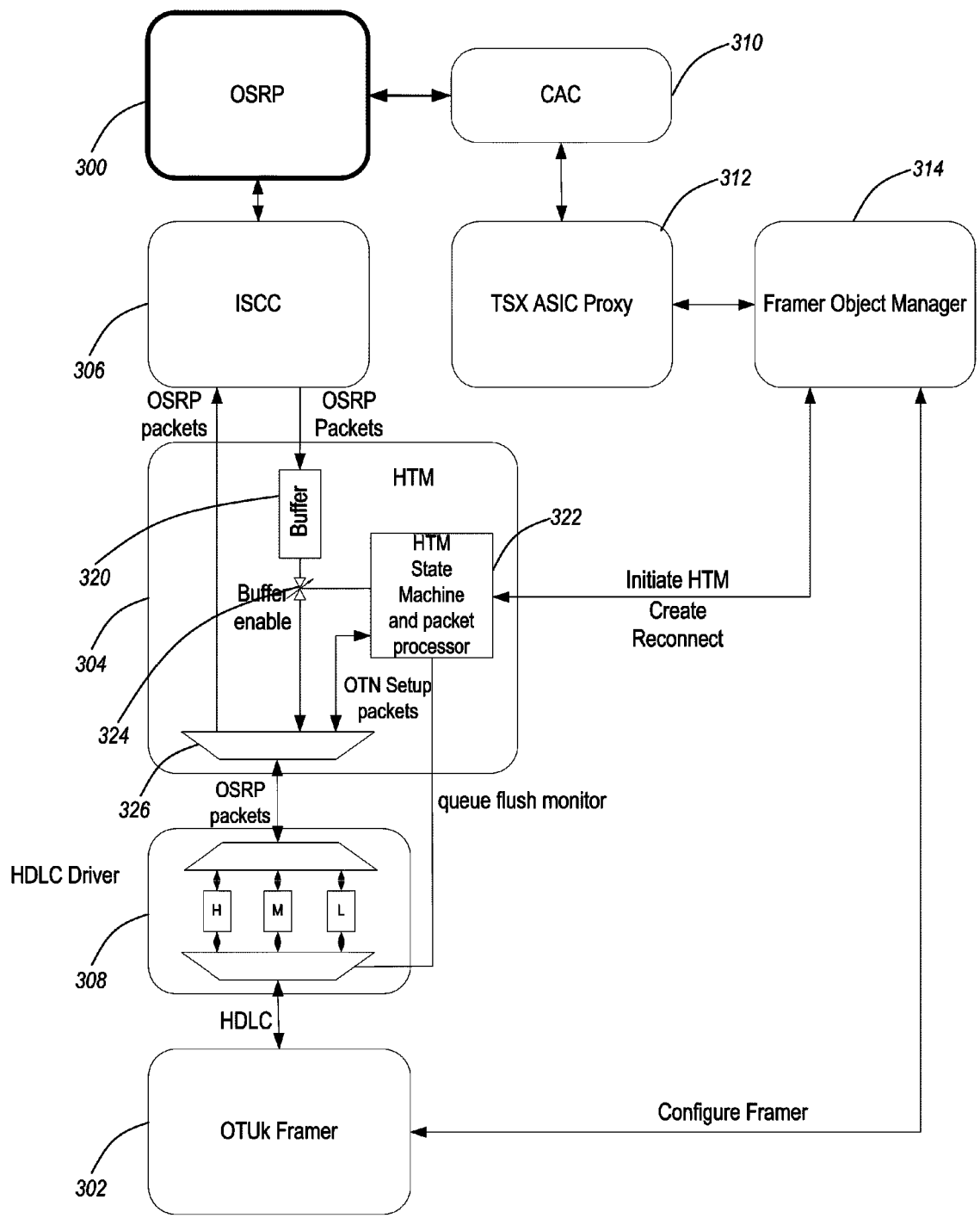
FIG. 3 is a functional block diagram of interaction between an OSRP subsystem and an OTUk framer with an intermediate HDLC Traffic Manager (HTM) according to an exemplary embodiment of the present invention.

Referring to FIG. 3, a functional block diagram illustrates interaction between an OSRP subsystem 300 and an OTUk framer 302 with an intermediate HDLC Traffic Manager (HTM) 304 according to an exemplary embodiment of the present invention. Each of the functional blocks is implemented in software, hardware, firmware, or combinations thereof in a network element (NE) or node in an OTN network using OSRP or equivalent. The fast OTN setup mechanism of the present invention utilizes the HTM 304 to implement the shim layer between OTN messaging and OSRP. In this exemplary embodiment, the HTM 304 resides between an Inter-Switch Communications Channel (ISCC) block 306 and an HDLC driver 308. The functional block diagram further includes a Call Admission Control (CAC) block 310, a Time-Space Switch (TSX) Application Specific Integrated Circuit (ASIC) proxy 312, and a Framer Object Manager 314. The CAC block 310 interfaces the OSRP subsystem 300 to handle requests for connections and to keep track of resource availability for each transmission line attached to a given node. The CAC block 310 interfaces to the TSX ASIC proxy 312 and the Framer Object Manager 314 to configure the OTUk framer 302 through the OSRP subsystem 300. The ISCC block 306 interfaces to the OSRP subsystem 300 to transmit/receives OSRP packets to/from the HTM 304. The ISCC block 306 enables in-band transmission through GCC of OTN frames. The HTM 304 interfaces to the HDLC driver 308 to map the corresponding OSRP packets to/from the OTUk framer 302. Note, the OTUk framer 302 can also provide ODUk framing as well.

The HTM 304 has the following functional blocks: a buffer 320 for outgoing control plane packets (i.e., OSRP packets from the ISCC block 306), an HTM state machine and packet processor 322, a buffer enable 324, an interface to the ISCC block 306 for OSRP traffic, an interface 326 to the HDLC driver 308 for OSRP traffic, and an interface to the Framer Object Manager 314 (to initialize, create, and reconnect messages). The buffer 320 includes storage, such as, for example, a first-in-first-out (FIFO) component, to buffer OSRP packets from the ISCC block 306 to the HDLC driver 308 in the fast OTN setup mechanism. The HDLC driver 308 includes a plurality of queues (designated as "H", "M", and "L" in the example of FIG. 3) to provide messages to the OTUk framer 302 using HDLC. These queues can be used to prioritize the OSRP packets based on a variety of factors.

The processor 322 can be any custom made or commercially available processor, a central processing unit (CPU), an auxiliary processor among several processors associated with a node controller or the like, a semiconductor-based microprocessor (in the form of a microchip or chip set), or generally any device for executing software instructions. The processor 322 is configured to execute software stored within a memory, to communicate data to and from the memory, and to generally control operations of the fast OTN setup mechanism pursuant to the software instructions. Thus, the HTM 304 subsystem can be implemented in software (CPU/micro-controller) or hardware (ASIC/FPGA). This choice between a software or hardware implementation does not change the fundamental design. Specifically, the processor 322 is configured to generate and terminate OTN fast setup packets, to perform HDLC queue flush by enabling the OSRP buffer, to monitor the queues in the HDLC driver 308, and the like.

Figure 4:
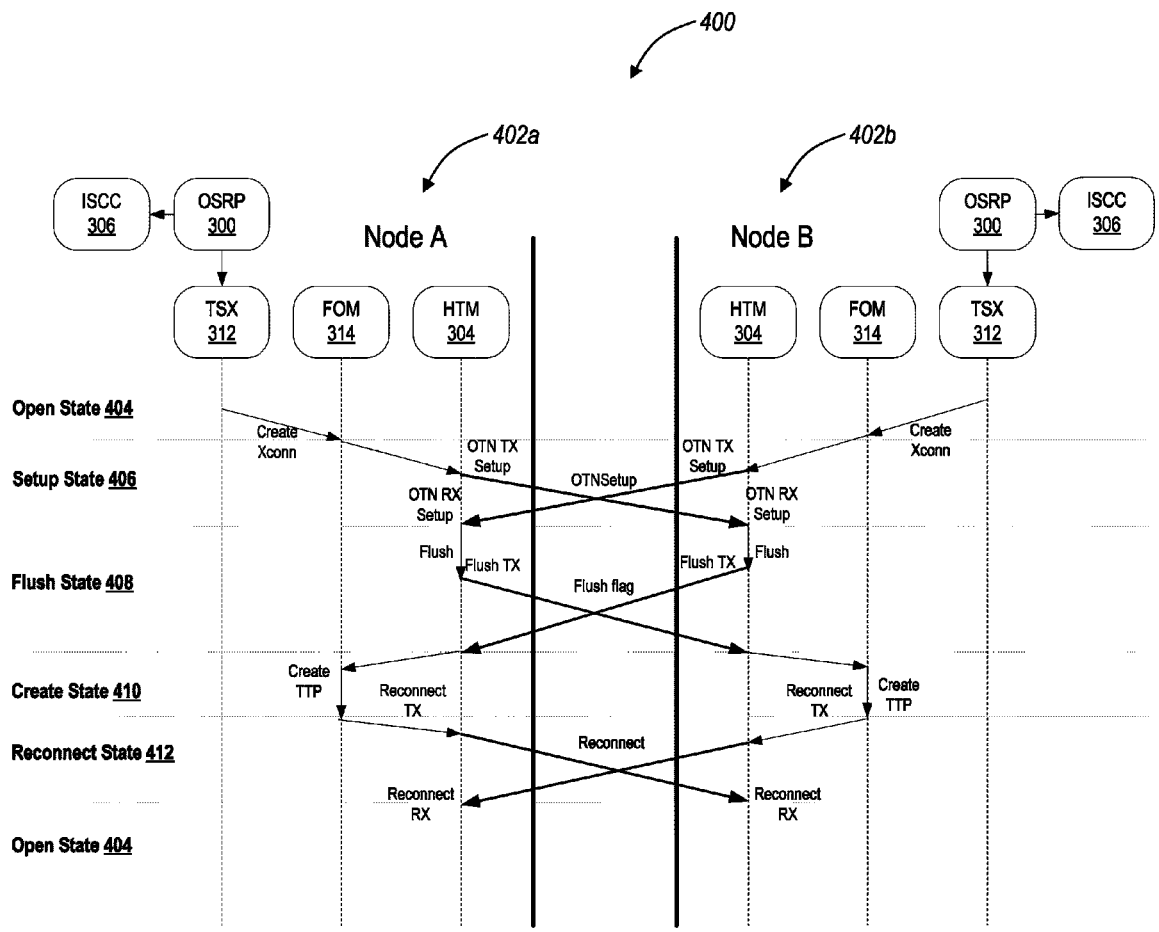
FIG. 4 is a state diagram of exemplary states associated with a processor in the fast OTN setup mechanism according to an exemplary embodiment of the present invention.

Referring to FIG. 4, a state diagram 400 illustrates exemplary states associated with the processor 322 in the fast OTN setup mechanism according to an exemplary embodiment of the present invention. The state diagram 400 includes two nodes 402a, 402b representing two nodes utilizing OSRP to set up an OTN connection with the fast OTN setup mechanism using the functional block diagram components of FIG. 3. The state diagram 400 can include an OPEN state 404, a SETUP state 406, a FLUSH state 408, a CREATE state 410, and a RECONNECT state 412. Collectively, the state diagram 400 is configured to implement the shim layer to ensure OSRP messages are not lost during rerouting and the like to implement the fast OTN setup mechanism.

When in the OPEN state 404, GCC communication has been fully established and OSRP/ISCC messages are flowing freely. The OTUk framer 302 is operational, but may be transmitting OCI in the ODUk overhead and payload. The SETUP state 406 is entered when a Call Connect is processed and OTUk/ODUk 302 framer provisioning is required to support the connection. When the HTM 304 gets a request to initialize, a setup message (packet) is sent to its peer. Upon entering the SETUP stage 406, a timer is initiated and OTUk defects are masked. GCC traffic is still flowing normally while in SETUP stage 406. The HTM 304 remains in SETUP until it receives a Setup or a Flush flag from the far end. When a Setup message or Flush flag is received from the far end, the HTM 304 enters the FLUSH state 408. The OSRP buffer is enabled, buffering outgoing OSRP packets. For example, high, low, and medium priority HDLC queues are monitored in the HDLC driver 308. When all queues are empty a Flush flag is sent to the peer. Received OSRP messages are still processed during the FLUSH state 408. The HTM 304 remains in the FLUSH state 408 until it has both transmitted the Flush Flag and received a Flush flag from its peer. Once the FLUSH state 408 is complete, the HTM 304 notifies the FOM 314, and the FOM 304 configures the OTUk/ODUk framer 302 hardware to support the connection requested by OSRP 300. This CREATE state 410 persists until the OTUk/ODUk TTP is configured and operational. An OTUk transmitter associated with the OTUk framer 302 is disabled during the CREATE state 410. Details on the interface creation are described below. Once the CREATE state 410 has completed, a Reconnect message is sent to the peer. When a reconnect has also been received from the peer the HTM 304 stops buffering egress OSRP traffic, and returns to the OPEN state 404. When a reconnect indicator is sent to FOM 314, or when the timer expires (whichever comes first), the system resumes monitoring of OTUk defects.

Figure 5:
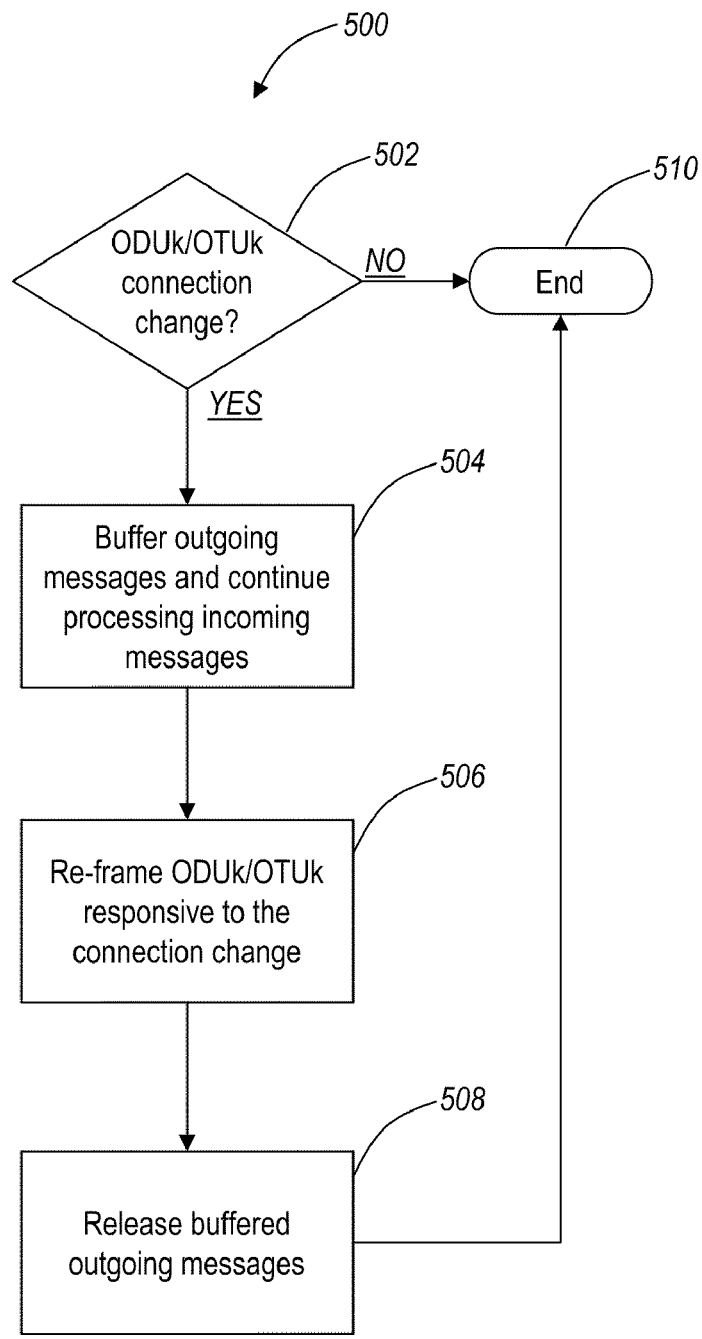
FIG. 5 is a flowchart of a fast OTN setup mechanism using a signaling and routing protocol according to an exemplary embodiment of the present invention.

Referring to FIG. 5, a flowchart illustrates a fast OTN setup mechanism 500 using a signaling and routing protocol according to an exemplary embodiment of the present invention. The OTN setup mechanism 500 is implemented on a network utilizing a signal and routing protocol to provide OTN-based connections. If there is an OTN (i.e., ODUk/OTUk) connection change (step 502), the mechanism 500 buffers outgoing messages while continuing to process incoming messages from the signal and routing protocol (step 504). Re-framing is performed on the ODUk/OTUk responsive to the connection change (step 506), and once re-framing is established, buffered outgoing messages are released (step 508) and the mechanism 500 ends (step 510).

The purpose of the mechanism 500 is to allow the OTUk to re-frame on its client ODUk during the connection change, while buffering out-going messages. When re-framing completes, buffers are released and the OTN messaging resumes without dropping any of the signaling frames thereby speeding up the connection change preventing retransmission in the signal and routing protocol that causes significant delay. Since running the OTN Setup protocol completes before any signaling and routing protocol packets are dropped, it can operate transparently with respect to the signaling and routing protocol, and can be easily ported without modifying signaling and routing protocol itself.

Figure 6:
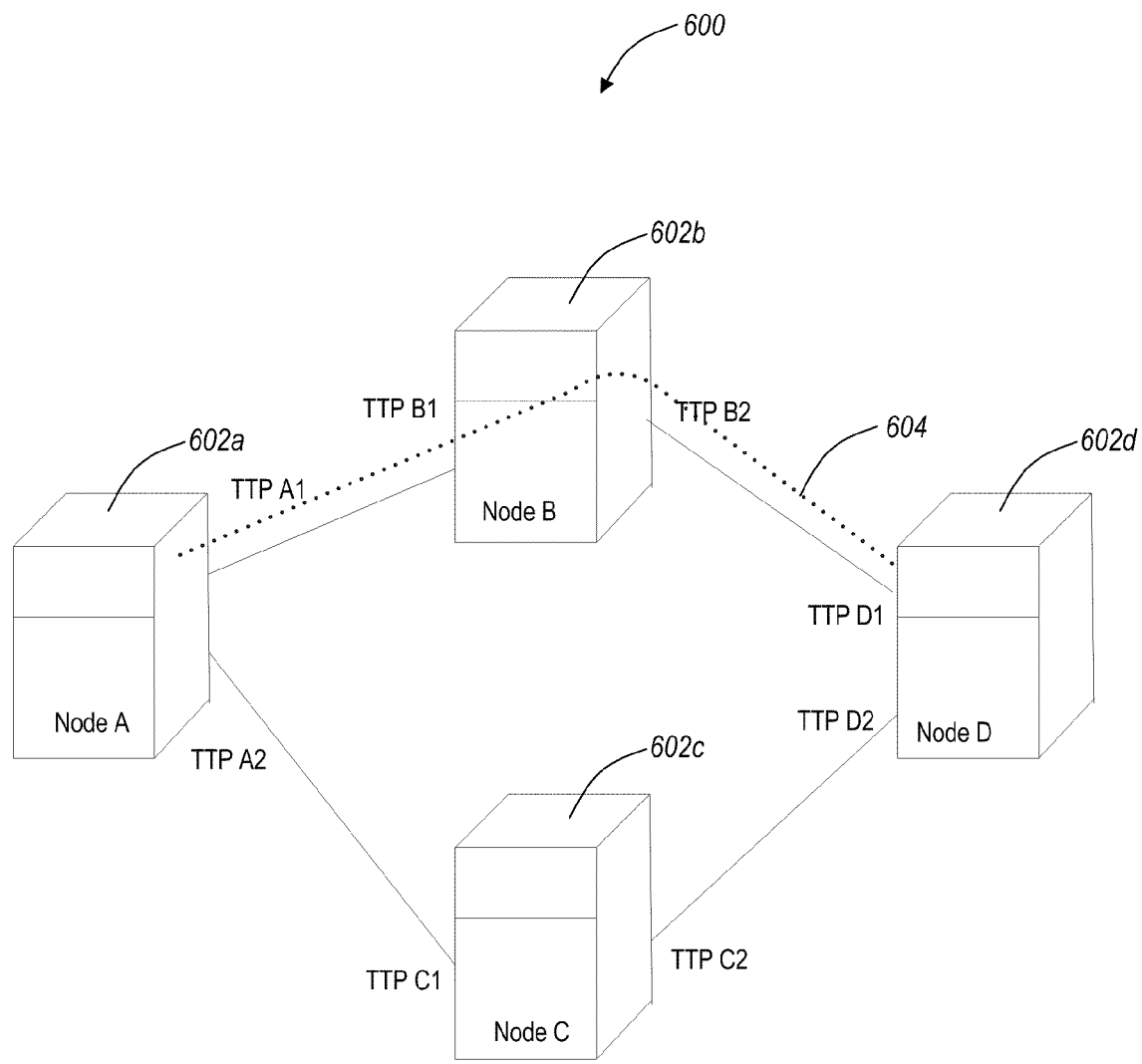
FIG. 6 is a diagram of a network with four nodes 602a-602d and an automatic interface creation process for mapping payloads according to an exemplary embodiment of the present invention.

Referring to FIG. 6, a network 600 with four nodes 602a-602d is illustrated with an automatic interface creation process for mapping payloads according to an exemplary embodiment of the present invention. The automatic interface creation process is provided for software to automatically partition an optical interface into the required TTPs with the required payload type mapping to carry circuits of the type requested by a peer node. The automatic interface creation process enables an automatically switched network to route and signal connections across TTPs that are not fully provisioned. The TTPs are configured to enable the routing and signaling protocol from one node to communicate with the routing and signaling protocol of another node. Further TTP configuration is done automatically based on the connections to be established or restored across the network.

The exemplary network 600 includes four nodes 602a-602d: Node 602a, Node 602b, Node 602c, and Node 602d. These nodes 602a-602d include: Node 602a TTP A1 connects to Node 602b TTP B1; Node 602a TTP A2 connects to Node 602c TTP C1; Node 602b TTP B2 connects to Node 602d TTP D1; and Node 602c TTP C2 connects to Node 602d TTP D2. In this example, the network links are OTU-2; however, other network types are possible. Initially, all TTPs are configured as OTU-2 TTPs with no payload provisioned. An open channel indicator is sent in place of payload (OCI).

Figure 7:
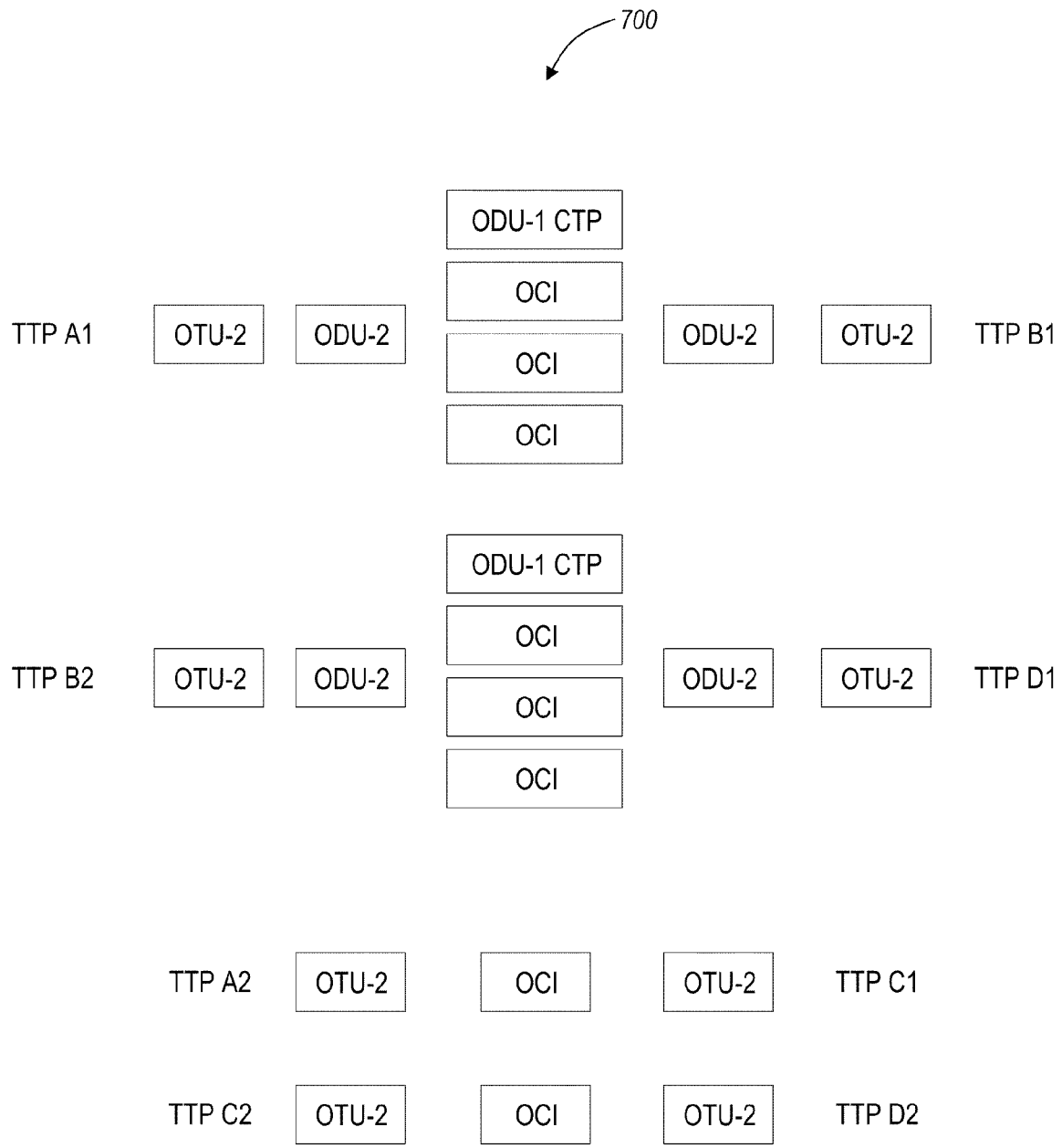
FIG. 7 is a diagram of automatic creation of ODU-2 TTPs for the network of FIG. 6 according to an exemplary embodiment of the present invention.

At some point, an ODU-1 circuit 604 is added to the network 600, and the route from Node 602a to Node 602d is calculated as TTP A1, TTP B2. Referring to FIG. 7, automatic creation 700 of ODU-2 TTPs is illustrated for the network 600 according to an exemplary embodiment of the present invention. The automatic interface creation process automatically creates ODU-2 TTPs within TTP A1, TTP B1, TTP B2, and TTP D1 to carry the ODU-1 CTP associated with the circuit 604. To automatically provision the subnetwork connection, the ODU TTPs in the network 600 are automatically configured. TTP A1 to TTP B1 each configures an ODU-2 TTP with four ODU-1 timeslots. One of the ODU-1 timeslot is allocated to the subnetwork connection, the other three remain available (with OCI). The other TTPs in the network 600 are not affected.

The present invention updates a routing database available at each node 602a-602d within the network 600. In this example, the routing databases for the link from TTP A2 to TTP C1 and the link from TTP C2 to TTP D2 publish available bandwidth of:

| Circuit Type | Available |
| --- | --- |
| ODU-2 | 1 |
| ODU-1 | 4 |
| OPVC | 16 |

The available bandwidth for the link from TTP A1 to TTP B1 and the link from TTP B2 to TTP D1 publish available bandwidth of:

| Circuit Type | Available |
| --- | --- |
| ODU-2 | 0 |
| ODU-1 | 3 |
| OPVC | 16 |

Figure 8:
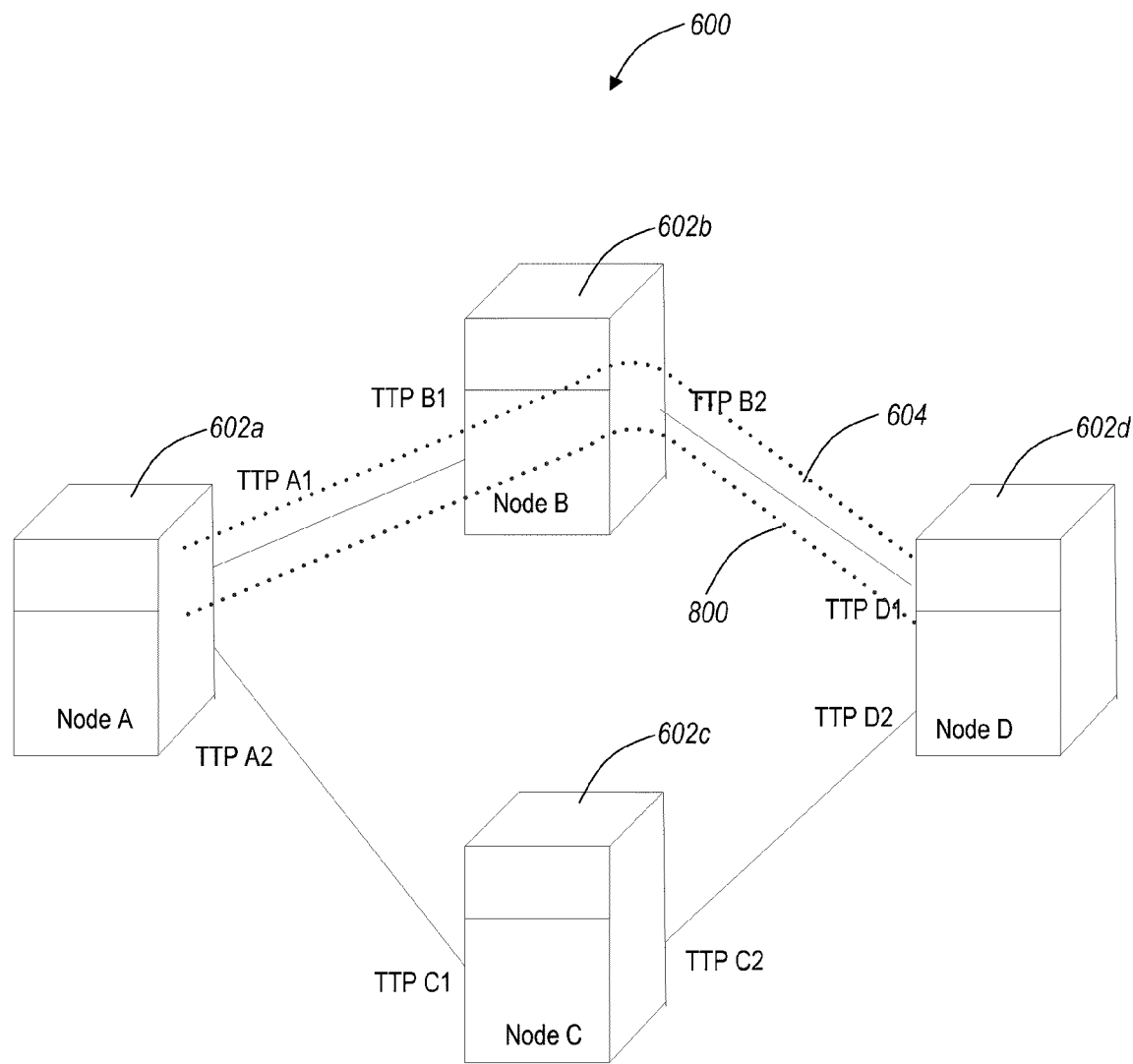
FIG. 8 is a diagram of the network of FIG. 6 with the addition of an Optical channel Payload Virtual Container (timeslot) (OPVC-1) circuit according to an exemplary embodiment of the present invention.

Referring to FIG. 8, the network 600 is illustrated with the addition of an Optical channel Payload Virtual Container (timeslot) (OPVC-1) circuit 800 in addition to the ODU-1 circuit 604 according to an exemplary embodiment of the present invention. The OPVC is a subdivision of the ODU-1 with sixteen OPVCs in an ODU-1. The OPVC-1 circuit 800 is added to the network 600 utilizing the automatic interface creation process, and the route from Node 602a to Node 602d is calculated as TTP A1, TTP B2.

Figure 9:
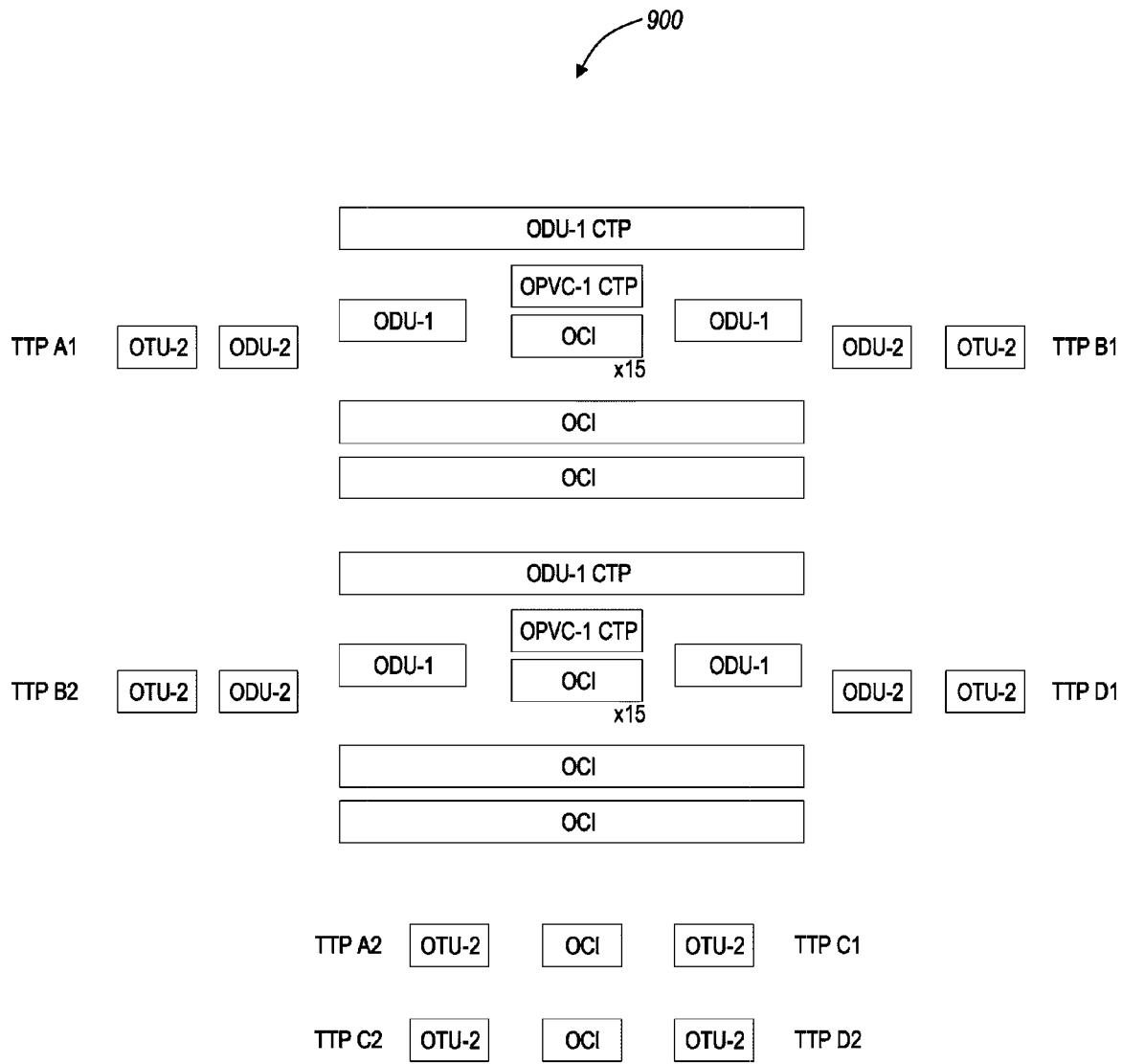
FIG. 9 is a diagram of automatic creation of OPVC-1 TTPs for the network of FIG. 9 according to an exemplary embodiment of the present invention.

Referring to FIG. 9, automatic creation 900 of OPVC-1 TTPs is illustrated for the network 600 according to an exemplary embodiment of the present invention. The present invention automatically creates ODU-1 TTPs within TTP A1, TTP B1, TTP B2, and TTP D1 to carry the OPVC-1 CTP. The ODU-2 TTPs within TTP A1, TTP B1, TTP B2, and TTP D1 remain along with the ODU-1 CTP on ODU-1 timeslot #1. The present invention auto creates and ODU-1 TTP, in this case on ODU-1 timeslot #2 within the ODU-2 to carry the OPVC-1 CTP.

Following the OPVC-1 circuit 800 creation, the routing databases for the link from TTP A1 to TTP B1 and the link from TTP B2 to TTP D1 publish available bandwidth of:

| Circuit Type | Available |
| --- | --- |
| ODU-2 | 0 |
| ODU-1 | 2 |
| OPVC | 16 |

Note that the OPVC available bandwidth is not reduced from 16 to 15 because the full complement of 16 OPVC timeslots could be provided within another ODU-1 TTP and another ODU-1 timeslot is available to be used as a TTP. Also note that the available bandwidth for the link from TTP A2 to TTP C1 and the link from TTP C2 to TTP D2 is not affected.

Figure 10:
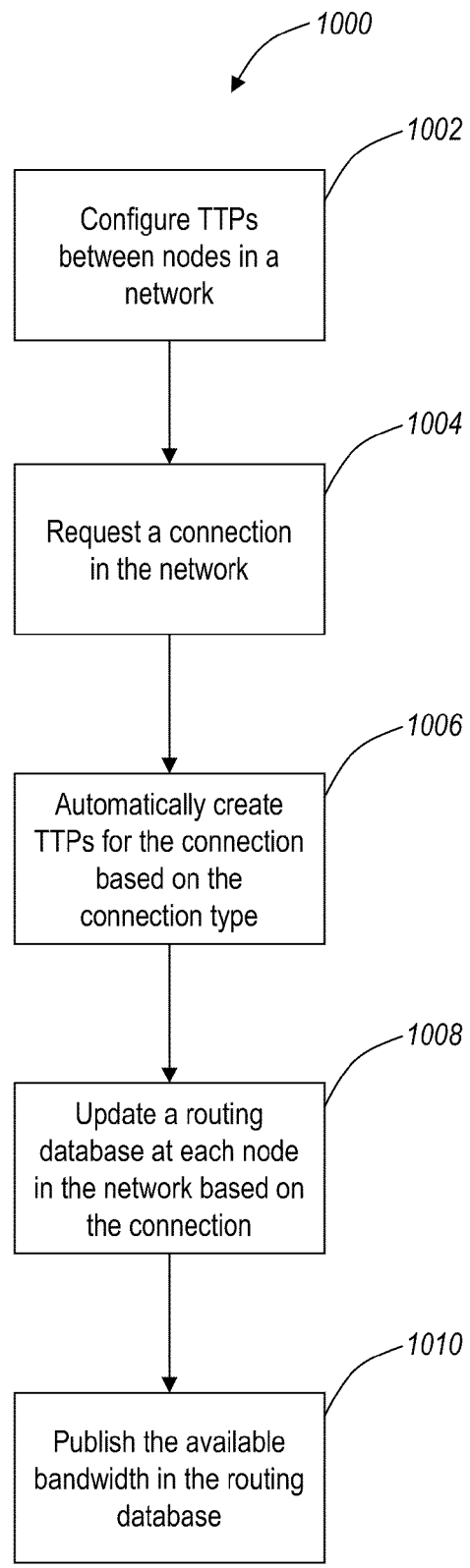
FIG. 10 is a flowchart of an automatic interface creation process for automatically partitioning an interface according to an exemplary embodiment of the present invention.

Referring to FIG. 10, a flowchart illustrates an automatic interface creation process 1000 for automatically partitioning an interface according to an exemplary embodiment of the present invention. The process 1000 enables a network to automatically partition an interface into the required TTPs with the required payload type mapping to carry circuits of the type requested by a peer node. The process 1000 can be implemented in a network with a plurality of nodes operating a signal and routing protocol. The process 1000 enables an automatically switched network to route and signal connections across TTPs that are not fully provisioned. The TTPs are configured to enable the routing and signaling protocol from one node to communicate with the routing and signaling protocol of another node. Further TTP configuration is done automatically based on the connections to be established or restored across the network. The automatic interface creation process 1000 can be utilized with the fast OTN setup mechanism described herein.

First, TTPs are configured between each node in the network (step 1002). For example, the network can include an optical network utilizing OTN and a signaling and routing protocol such as OSRP or G-MPLS. A connection (e.g., ODU-1, OTU-1, OPVC-1, etc.) is requested in the network (step 1004), such as through the signaling and routing protocol. The process 1000 automatically creates TTPs for the connection at nodes in the network based on the connection type (step 1006). For example, if the connection is an ODU-1, the TTPs are setup for ODU-1, etc. A routing database is updated at each node in the network based on the connection (step 1008). Finally, the available bandwidth is published in the routing database (step 1010).

Figure 11:
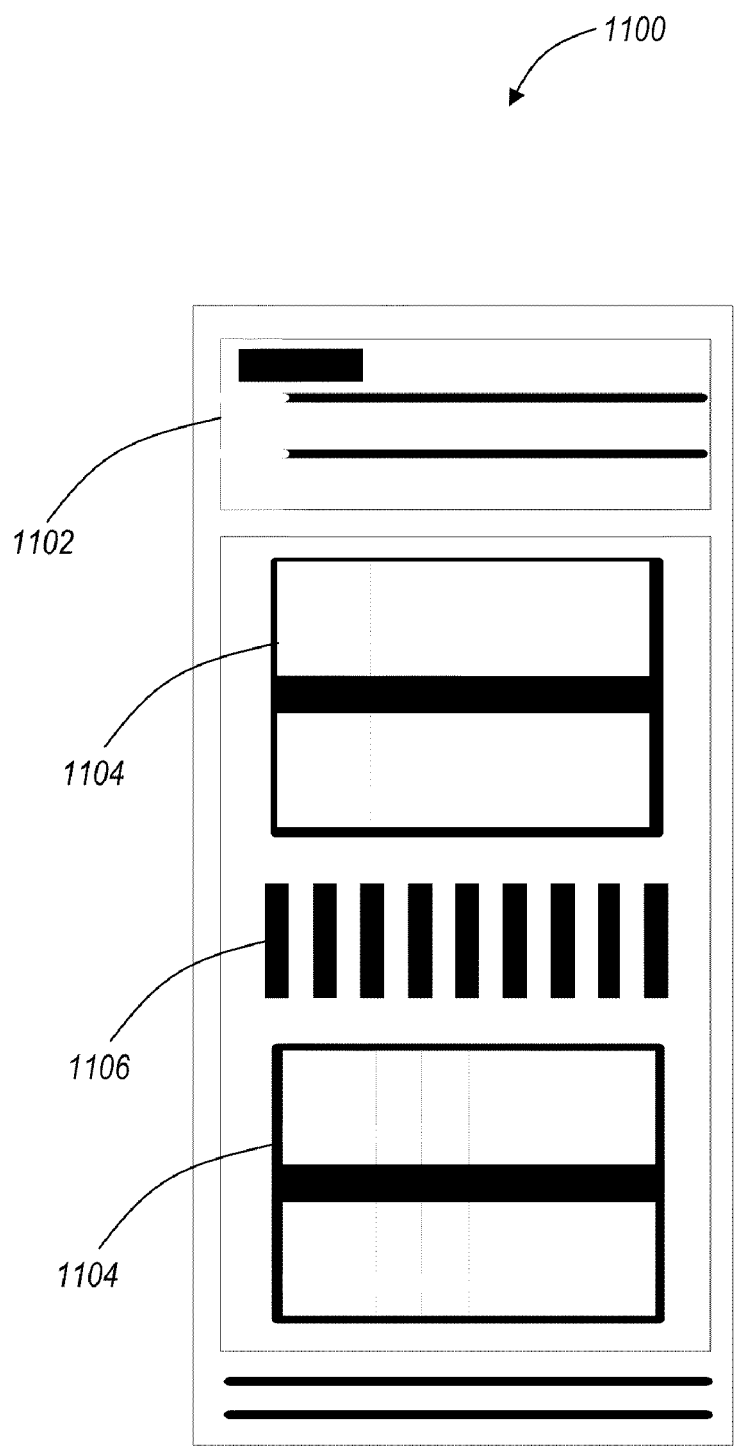
FIG. 11 is a diagram of a network element that is configured to provide the fast OTN setup mechanism and the automatic interface creation process according to an exemplary embodiment of the present invention.

Referring to FIG. 11, a network element 1100 that is configured to provide the fast OTN setup mechanism and the automatic interface creation process is illustrated according to an exemplary embodiment of the present invention. The network element 1100 is configured to connect to other network elements 1100 and the like to form a network. The network element 1100 is an exemplary embodiment of a network node, and those of ordinary skill in the art will recognize that other node types are also contemplated by the present invention. The network element 1100 can be an OTN or SONET/SDH optical cross-connect, Asynchronous Transfer Mode (ATM) switch, Multi-Service Provisioning Platform (MSPP), or the like.

The network element 1100 includes common equipment 1102, line modules 1104, and switch modules 1106. The common equipment 1102 can include power; control for operations, administration, maintenance, and provisioning (OAMP); timing; control plane interface; and the like. The network element 1100 can include a backplane, mid-plane, or the like to enable the common equipment 1102 and modules 1104, 1106 to communicate data and control information.

The line modules 1104 can each include one or more optical or electrical interfaces to provide ingress and egress from the network element 1100. For example, the optical interfaces can include 10 Gb/s, 40 Gb/s, 100 Gb/s, and the like bit rates with additional overhead for framing (e.g., OTN, SONET/SDH, etc.) and forward error correction (FEC). Additionally, the optical interfaces can include dense wave division multiplexing (DWDM) or the like to increase capacity over an optical fiber. The electrical interfaces can include Ethernet interfaces and the like. The line modules 1104 connect to other line modules 1104 and the like in other nodes to form the network. The interconnection of the line modules 1104 creates a mesh, ring, linear, or the like network topology over which the signaling and routing protocol is configured to setup connections.

The switch modules 1106 are configured to provide optical and/or electrical switching of connections from the line modules 1104. For example, the switch modules 1106 can form a Clos switch architecture with the line modules 1104 to provide a fully non-blocking M×N switch. In an exemplary embodiment, the switch modules 1106 are configured to provide OTN switching and to use the signaling and routing protocol to establish fast OTN mesh setup and automatic interface creation as described herein.

Advantageously, the present invention enables fast mesh restoration without requiring retransmission of protocol messages that can extend restoration times in excess of 100 ms. The present invention reduces operational complexity associated with conventional network and allows greater flexibility of network resources. Using OTN, the present invention allows a single network resource to provide a redundant (protect) path for multiple service types.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An Optical Transport Network node, comprising:
a control plane;
an Optical Transport Network framer; and
an intermediate layer between the control plane and the Optical Transport Network framer, wherein the intermediate layer is configured to perform a fast Optical Transport Network mechanism for Optical Transport Network connections;
wherein the intermediate layer comprises:
a buffer configured to receive messages from the control plane;
a buffer enable switch configured to enable and disable the buffer; and
a processor connected to the buffer enable switch, the control plane, and the Optical Transport Network framer.

2. The Optical Transport Network node of claim 1, wherein the processor is configured to:
responsive to an Optical Transport Network connection change, buffer outgoing messages from the control plane; and
responsive to re-framing associated with the Optical Transport Network connection change, release the buffered outgoing messages from the control plane such that the outgoing messages are not lost during the re-framing thereby speeding up the Optical Transport Network connection change.

3. The Optical Transport Network node of claim 2, wherein the intermediate layer is configured to provide incoming messages from the Optical Transport Network framer to the control frame without buffering.

4. The Optical Transport Network node of claim 1, wherein the processor is configured to implement a state machine to process incoming and outgoing messages to and from the control plane ensuring no messages are lost during an Optical Transport Network connection change requiring re-framing.

5. The Optical Transport Network node of claim 1, wherein the intermediate layer operates independently of the control plane ensuring no messages are lost during an Optical Transport Network connection change requiring re-framing.

6. The Optical Transport Network node of claim 1, further comprising an automatic interface creation process configured to automatically partition an interface at the node into required Trail Termination Points with a required payload type mapping to carry circuits of a type requested by a peer node.

7. The Optical Transport Network node of claim 6, wherein the automatic interface creation process is configured to allow the control plane to route and signal connections across Trail Termination Points that are not fully provisioned.

8. The Optical Transport Network node of claim 1, wherein the control plane utilizes one of Optical Signaling and Routing Protocol (OSRP), Automatically Switched Optical Networks (ASON), and Generalized Multi-Protocol Label Switching (GMPLS).

9. The Optical Transport Network node of claim 1, wherein the Optical Transport Network node is in a mesh network providing restoration through the control plane.

10. A fast Optical Transport Network setup method, comprising:
responsive to an Optical Transport Network connection change, buffering outgoing messages from a signaling and routing protocol associated with a control plane;
re-framing an Optical Transport Network connection responsive to the Optical Transport Network connection change; and
responsive to re-framing, releasing the buffered outgoing messages from the signaling and routing protocol such that the outgoing messages are not lost during the re-framing thereby speeding up the Optical Transport Network connection change.

11. The fast Optical Transport Network setup method of claim 10, further comprising:
receiving incoming messages from the signaling and routing protocol during the re-framing.

12. The fast Optical Transport Network setup method of claim 10, further comprising:
providing the Optical Transport Network connection change without requiring retransmission of outgoing messages from the signaling and routing protocol.

13. The fast Optical Transport Network setup method of claim 10, further comprising:
responsive to the Optical Transport Network connection change, automatically creating Trail Termination Points for a connection based on a connection type;
updating a routing database; and
publishing the available bandwidth in the routing database.

14. The fast Optical Transport Network setup method of claim 10, wherein the signaling and routing protocol comprises one of Optical Signaling and Routing Protocol (OSRP), Automatically Switched Optical Networks (ASON), and Generalized Multi-Protocol Label Switching (GMPLS).

15. A method to automatically partition an interface into required Trail Termination Points, comprising:
configuring a plurality of Trail Termination Points between nodes in a network;
responsive to a connection change in the network, automatically creating Trail Termination Points for a connection based on a connection type;
updating a routing database at each node in the network;
publishing the available bandwidth in the routing database;
wherein the method is implemented in a network comprising a plurality of Optical Transport Network links and a control plane, and
responsive to the connection change in the network, buffering outgoing messages from the control plane until the connection change is reframed on one of the Optical Transport Network links.

16. The method of claim 15, further comprising:
utilizing the control plane to route and signal connections across Trail Termination Points that are not fully provisioned.

17. The method of claim 15, further comprising:
providing mesh restoration without requiring retransmission of messages from the control plane.

* * * * *